United States Patent
Ueda

[19]

[11] Patent Number: 5,923,816
[45] Date of Patent: Jul. 13, 1999

[54] RECORDING APPARATUS WHICH SWITCHES FROM DISPLAYING A STILL IMAGE TO DISPLAYING A MOVING IMAGE DURING RECORDING AND RECORDS STILL IMAGES DURING RECORDING MOVING IMAGES

[75] Inventor: Osamu Ueda, Kanagawa-ken, Japan

[73] Assignee: Canon Kabushiki Kaisha, Tokyo, Japan

[21] Appl. No.: 08/458,224

[22] Filed: Jun. 2, 1995

Related U.S. Application Data

[63] Continuation of application No. 08/247,504, May 23, 1994., abandoned, which is a continuation of application No. 07/916,591, Jul. 20, 1992., abandoned

[30] Foreign Application Priority Data

Jul. 25, 1991 [JP] Japan .................................. 3-186185

[51] Int. Cl.⁶ ........................ H04N 5/225; H04N 5/76; H04N 5/91; H04N 5/917
[52] U.S. Cl. .......................... 386/121; 386/109; 348/220
[58] Field of Search .................................. 358/335, 310, 358/342, 406; 348/207, 220; 360/33.1, 35.1; 386/8, 1, 46, 104, 121; H04N 5/76, 5/78, 5/781, 5/782, 5/783, 5/225, 5/92, 9/74

[56] References Cited

U.S. PATENT DOCUMENTS

| 4,651,227 | 3/1987 | Yunoki et al. ......................... 358/310 |
|---|---|---|
| 4,691,253 | 9/1987 | Silver ...................................... 358/906 |
| 4,858,032 | 8/1989 | Okada et al. ........................... 358/343 |
| 4,903,132 | 2/1990 | Yamawaki .............................. 358/209 |
| 4,939,593 | 7/1990 | Yuuchi et al. ......................... 358/909 |
| 4,956,725 | 9/1990 | Kojuki et al. .......................... 358/335 |
| 5,016,112 | 5/1991 | Nakajima et al. ..................... 358/906 |
| 5,027,214 | 6/1991 | Fujimori ................................ 358/909 |
| 5,043,816 | 8/1991 | Nakano et al. ........................ 358/209 |
| 5,057,925 | 10/1991 | Tsutsui et al. ........................ 358/335 |
| 5,084,766 | 1/1992 | Nakatani ................................ 358/335 |
| 5,130,860 | 7/1992 | Nagashima et al. .................. 360/33.1 |
| 5,161,025 | 11/1992 | Nakao ................................... 358/906 |
| 5,168,363 | 12/1992 | Kojima et al. ........................ 358/906 |
| 5,202,798 | 4/1993 | Takei et al. ........................... 358/906 |
| 5,229,862 | 7/1993 | Takahashi et al. .................... 358/335 |

*Primary Examiner*—Douglas W. Olms
*Assistant Examiner*—David R. Vincent
*Attorney, Agent, or Firm*—Robin, Blecker & Daley

[57] ABSTRACT

A recording apparatus of the kind recording a moving image signal in a first area on a recording medium and a still image signal in a second area on the recording medium is arranged to selectively display the moving image signal or the still image signal, and to display, along with the image on display, information which indicates that the still image is in the process of being recorded. The arrangement enables the operator of the apparatus to know that the apparatus is in the process of recording the still image as well as the contents of the still image being recorded and thus enables the operator to avoid faulty recording, etc.

12 Claims, 2 Drawing Sheets

RECORDING APPARATUS WHICH SWITCHES FROM DISPLAYING A STILL IMAGE TO DISPLAYING A MOVING IMAGE DURING RECORDING AND RECORDS STILL IMAGES DURING RECORDING MOVING IMAGES

This is a continuation application under 37 CFR 1.62 of prior application Ser. No. 08/247,504, filed May 23, 1994, now abandoned, which is a continuation of Ser. No. 07/916, 591, filed Jul. 20, 1992, now abandoned.

BACKGROUND OF THE INVENTION

1. Field of the Invention

This invention relates to a recording apparatus which is capable of recording a moving image and a still image on the same recording medium.

2. Description of the Related Art

A demand for high-density recording has recently increased in the field of magnetic recording. Video tape recorders (hereinafter referred to as VTRs) also have come to be arranged to perform recording with a higher density by lowering the traveling speed of the tape.

However, in a case where an audio signal is to be recorded with a stationary head, for example, the reduction of the tape travel speed brings forth a problem that the quality of reproduced sounds is degraded because it is impossible to have the sufficiently high relative speed of a tape to the head. According to one of known methods for solving this problem, the length of recording tracks to be scanned by a rotary head is extended to be longer than the conventional length and audio signals which are time-base-compressed are recorded one after another in the extension parts of the tracks.

More specifically, in the case of a VTR of the rotary-two-head helical scanning type, the VTR has been arranged to have a magnetic tape wrapped at least 180 degrees around a rotary cylinder. Whereas, in accordance with this method, the magnetic tape is arranged to be wrapped at least (180+θ) degrees around a rotary cylinder and an audio signal which has been subjected to a PCM (pulse-code modulation) process and time-base-compressed is recorded in the area of "θ" degrees (hereinafter referred to as a PCM audio signal area or a PCM area).

FIG. 1 shows the tape transport system of the above-stated VTR. FIG. 2 shows the recording tracks formed on the magnetic tape by the arrangement of the VTR shown in FIG. 1. In FIGS. 1 and 2, reference numeral 6 denotes the magnetic tape. Reference numeral 18 denotes the rotary cylinder. Heads 5A and 5B are mounted on the rotary cylinder 18. A video signal area 19 and a PCM audio signal area 20 are formed in each of the recording tracks formed on the magnetic tape 6. The heads 5A and 5B are arranged to trace the video signal area 19 within the angle range of 180 degrees around the rotary cylinder 18 and the PCM audio signal area 20 within the angle range of θ degrees around the rotary cylinder 18.

As one example of an application of the above-stated method of recording the digital signal in the different area while the video signal is being recorded, a method for recording a still image digital signal within the digital signal area 20 has been proposed. In the case of a still image, one picture of still image information is completely recordable on the magnetic tape by using the PCM areas of a plurality of recording tracks.

This method not only permits the use of the same apparatus and the same recording medium both for taking a moving image and for taking a still image but also gives the still image with a higher grade of picture quality than a still image obtained by stopping the tape from traveling and by reproducing a video signal recorded in the same track formed on the tape.

However, in accordance with the above-stated example of the prior art method, a still image being taken cannot be monitored in recording the still image. It is, therefore, impossible to let the operator know the timing of the still image recording. It is also impossible for the operator to know the brightness and color tones of the still image being taken.

A further problem of the prior art method lies in that the recording time changes with variations in compression rate and bit rate set for the process of still image recording. Therefore, it is impossible to grasp the length of time required for the completion of the still image recording. It is thus hardly possible, for example, to find appropriate timing for bringing the still image recording action to an end and to determine release timing for a next still image recording process.

SUMMARY OF THE INVENTION

Such being the background situation, it is a general object of this invention to provide a recording apparatus which is arranged to be capable of solving the above-stated problems of the prior art.

It is a more specific object of the invention to provide a recording apparatus which is arranged to be capable of reliably informing the operator of the details of still images being recorded along with moving images.

Under this object, a video signal recording apparatus arranged as an embodiment of this invention comprises: moving image generating means for generating a moving image signal representing a moving image; still image generating means for generating a still image signal representing a still image; recording means for recording a first recording signal corresponding to the moving image signal in a first area on a recording medium and for recording a second recording signal corresponding to the still image signal in a second area on the recording medium; switching means for selectively outputting either the moving image signal or the still image signal; and display means for displaying an output of the switching means as a visible image.

It is another object of the invention to provide a recording apparatus which is capable of accurately grasping that a process of recording a still image along with a moving image is under way or has come to an end.

Under that object, a video signal recording apparatus arranged as another embodiment of the invention comprises: moving image generating means for generating a moving image signal representing a moving image; still image generating means for generating a still image signal representing a still image; recording means for recording a first recording signal corresponding to the moving image signal in a first area on a recording medium and for recording a second recording signal corresponding to the still image signal in a second area on the recording medium; display means for visibly displaying at least the moving image corresponding to the moving image signal; and combining means for combining with an input signal to the display means a character signal which indicates that the still image is in process of being recorded, during the process of recording the second recording signal by the recording means.

The above and other objects and features of this invention will become apparent from the following detailed description of an embodiment thereof given in connection with the accompanying drawings.

DETAILED DESCRIPTION OF THE PREFERRED EMBODIMENT

An embodiment of this invention is described in detail below with reference to FIG. 3, which is a block diagram showing in outline the arrangement of a VTR according to the embodiment of the invention.

Figure 1:
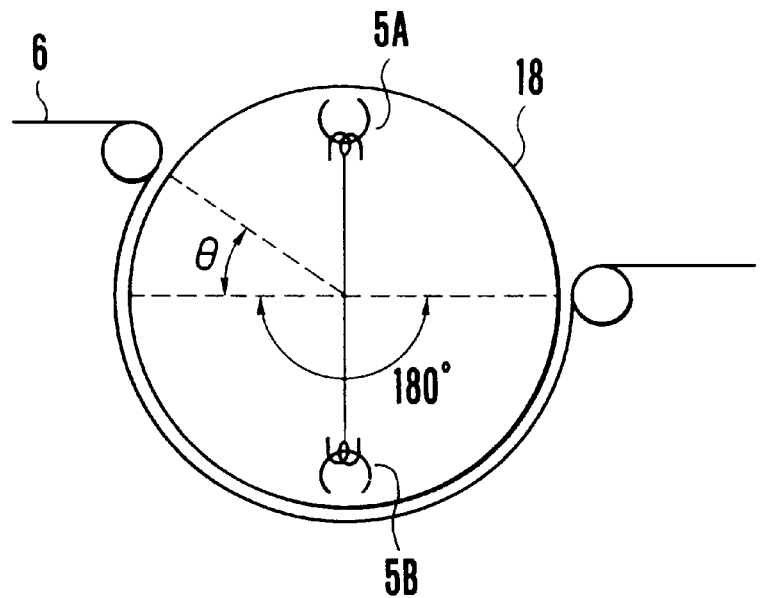
FIG. 1 is a schematic illustration showing the tape transport system of the conventional VTR having an analog video signal recording area and a digital signal recording area.
Figure 2:
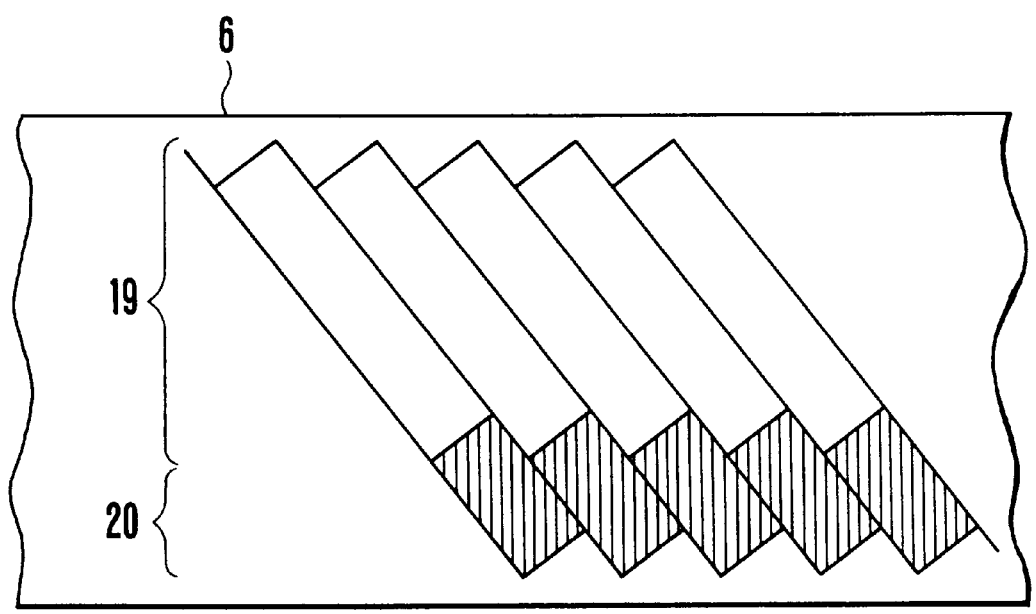
FIG. 2 is an illustration of recording tracks formed on a tape by the VTR shown in FIG. 1.
Figure 3:
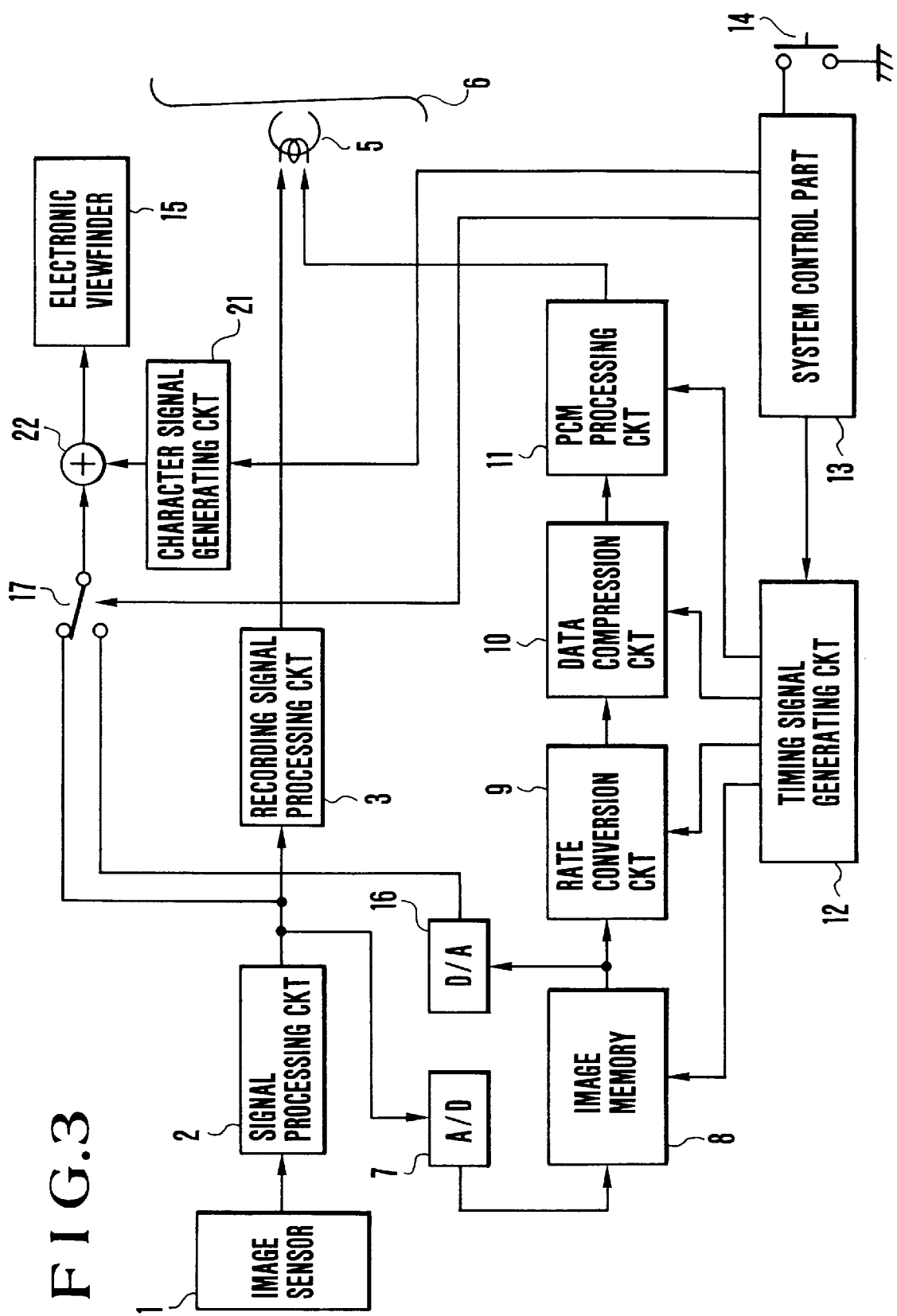
FIG. 3 is a block diagram showing in outline the arrangement of a VTR according an embodiment of this invention.

Referring to FIG. 3, an image sensor 1 is arranged to convert an image into an electrical signal. A signal processing circuit 2 is arranged to process the signal outputted from the image sensor 1 and to output an analog video signal. A recording signal processing circuit 3 is arranged to process the analog video signal outputted from the signal processing circuit 2 into an analog signal to be recorded on a magnetic tape 6.

A head 5 is arranged to record signals on the magnetic tape 6. An A/D (analog-to-digital) converter 7 is arranged to convert the analog video signal outputted from the signal processing circuit 2 into digital video signal data. An image memory 8 is arranged to temporarily store the digital video signal data. A rate conversion circuit 9 is arranged to convert the rate of the data read out from the image memory 8 into a rate for recording. A data compression circuit 10 is arranged to compress the data.

A PCM (pulse-code modulation) processing circuit 11 is arranged to add to the data an error correction code, ID data, block address data, etc., or to perform an interleaving process on the data. A timing signal generating circuit 12 is arranged to generate a timing signal for each of the circuit elements 8 to 11. A system control part 13 is arranged to control the action of each of various parts of the VTR, still image recording, etc. An electronic viewfinder 15 is arranged to display a moving image to be recorded.

The signal obtained by the image pickup action of the image sensor 1 is converted into a video signal by the signal processing circuit 2. The video signal is converted into an analog recording signal by the recording signal processing circuit 3. The analog recording signal thus obtained is recorded by the head 5 in the video signal area 19 of each track on the magnetic tape 6.

Meanwhile, when a release button 14 is pushed, the video signal from the signal processing circuit 2 is converted into digital data by the A/D converter 7. Then, one field-amount or frame-amount of the digital data thus obtained is stored in the image memory 8 as still image data. The still image data thus stored is repeatedly read out in a cycle of one field or one frame. The rate of the one field-amount or frame-amount of still image data thus read out is converted into a recording rate by the rate conversion circuit 9. The rate-converted still image data outputted from the rate conversion circuit 9 is supplied to the data compression circuit 10 to be compressed there. Different data compression ratios are arranged stepwise. The data is compressed by switching the compression ratio from one ratio over to another according to the purpose.

The compressed data is supplied to the PCM processing circuit 11 to be converted into recording PCM data. The PCM data converting action is also arranged to be performed at one of different bit rates according to the purpose. After PCM data conversion, the data is recorded by the head 5 in the digital signal area 20 of each applicable track on the magnetic tape 6.

The video data for the same field or frame is read out from the image memory 8 as still image data for every field-period or frame-period. A D/A converter 16 is arranged to D/A (digital-to-analog) convert this still image data into an analog video signal. Further, the analog video signal which is outputted from the signal processing circuit 2 and the analog video signal which is outputted from the D/A converter 16 are supplied to the respective two input terminals of a switch 17.

A character signal generating circuit 21 is arranged to generate a character signal in synchronism with the video signal outputted from the switch 17 and to supply the character signal to an adder 22. The adder 22 is arranged to combine the video signal outputted from the switch 17 and the character signal outputted from the character signal generating circuit 21 with each other.

During the process of taking a moving image, the video signal outputted from the signal processing circuit 2 is converted into a recording signal by the recording signal processing circuit 3. The recording signal is not only recorded on the magnetic tape 6 by the head 5 but is also sent to the switch 17.

Meanwhile, when the release button 14 is pushed to give an instruction for taking a still image, the video signal outputted from the signal processing circuit 2 is converted into digital data by the A/D converter 7. As a result, one field-amount or frame-amount of still image data is stored in the image memory 8. After the release button 14 is pushed as mentioned above, the stored still image data is repeatedly read out in a cycle of one field-period or frame-period. The still image data thus read out is supplied to the D/A converter 16. The contents of the still image data to be recorded are converted by the D/A converter 16 into an analog video signal. The analog video signal is sent to the switch 17.

The system control part 13 sends a switching signal to the switch 17 when the release button 14 is pushed. In accordance with the switching signal, the switch 17 switches its output from the moving image signal outputted from the signal processing circuit 2 over to the still image signal outputted from the D/A converter 16.

Then, the still image to be recorded can be confirmed as the position of the switch 17 is arranged to be brought back to its initial moving image signal position after the lapse of a given period of time of, for example, 0.5 sec. This arrangement not only permits the operator to confirm the still image recording but also allows the moving image recording to be carried out without hindrance.

Further, the system control part 13 is arranged to compute a length of time required for the still image recording from the compression ratio and the bit rate of the still image recording, to cause the character signal generation circuit 21 to generating the character signal indicating that the still image recording is in process during a period of time from the time when the release button 14 is pushed until the completion of the still image recording, and to cause the adder 22 to have the character signal displayed on the electronic viewfinder 15 in a composite state.

The arrangement of the embodiment described above enables a VTR of the kind recording a PCM still image along with a moving image to display the still image, when the still image is in process of being recorded, for a given period of time on the electronic viewfinder which is provided for monitoring a moving image being taken. The embodiment thus permits monitoring the contents of the still image being recorded. A still image, therefore, can be obtained in a manner as desired by the photographer. Besides, a moving image taking process can be also monitored without being hindered by the still image recording operation.

Further, the arrangement of the embodiment also permits confirmation of still image recording time by causing the character signal which indicates that the still image is in process of being recorded to be generated and displayed in a composite state on the same viewfinder during the process of still image recording.

What is claimed is:

1. A video signal recording apparatus, comprising:

a) recording means arranged to record a moving image signal and a digital still image signal on a recording medium with a recording period of said digital still image signal being longer than a period of one picture of a moving image, thus enabling instruction of recording of a still image during the recording of said moving image signal; and b) display means for selectively displaying the moving image corresponding to the moving image signal and the still image corresponding to the digital still image signal, wherein said display means changes from displaying the moving image to displaying the still image corresponding to the digital still image signal in response to a start of recording of the digital still image signal by said recording means, and wherein said display means automatically changes from displaying the still image to displaying the moving image after a predetermined period of time has elapsed since the digital still image signal started to be recorded.

2. A recording apparatus, comprising:

a) a memory for storing an image signal for one picture of a moving image signal obtained by an image sensor;

b) still image signal generating means for repeatedly reading the image signal for one picture from the memory and thereby generating a digital still image signal;

c) recording means for recording the moving image signal and the digital still image signal on a recording medium with a recording period of said digital still image signal being longer than a period of one picture of a moving image, thus enabling instruction of recording of a still image during the recording of said moving image signal;

d) display means for displaying the moving image represented by the moving image signal and the still image represented by the digital still image signal; and e) a controller for controlling said display means so as to change from displaying the moving image to displaying the still image represented by the digital still image signal in response to a start of recording of the digital still image signal by said recording means, to automatically change from displaying the still image to displaying the moving image after a predetermined period of time has elapsed since the digital still image signal started to be recorded.

3. An apparatus according to claim 2, wherein the still image is a digital signal.

4. An apparatus according to claim 2, wherein the still image signal generating means includes reading means for repeatedly reading the image signal for one picture from the memory, compressing means for compressing an information amount of the still image signal, and PCM processing means for adding an error correction code and ID code to the still image signal.

5. An apparatus according to claim 4, wherein the compressing means compresses the information amount of the still image signal with a plurality of compression ratios which are different from each other.

6. An apparatus according to claim 2, wherein the recording means has a rotary head for tracing the recording medium to form a plurality of tracks, each of the moving image signal and the still image signal being recorded on said plurality of tracks.

7. A recording apparatus arranged to generate a moving image signal by an image sensor and generate a digital still image signal by using the moving image signal to form a plurality of tracks on a tape-shaped recording medium and record the moving image signal and the digital still image signal on the plurality of tracks, and to selectively display by an electronic viewfinder a moving image represented by the moving image signal and a still image represented by the digital still image signal with a recording period of said digital still image signal being longer than a period of one picture of the moving image, thus enabling instruction of recording the still image during the recording of said moving image signal, wherein said electronic viewfinder changes from displaying the moving image to displaying the still image represented by the digital still image signal in response to a start of recording of the digital still image signal by recording means, to automatically change from displaying the still image to displaying the moving image after a predetermined period of time has elapsed since the digital still image signal started to be recorded.

8. A recording apparatus, comprising:

imaging means for receiving an object light and generating a moving image signal representing the object;

still image signal generating means for generating a digital still image signal by using the moving image signal obtained by said imaging means;

recording means for recording the moving image signal and the digital still image signal on a recording medium with a recording period of said digital still image signal being longer than a period of one picture of a moving image;

a manually operable member for manually instructing a recording of the digital still image signal by said recording means thus enabling instruction of recording of a still image during the recording of said moving image signal;

display means for displaying the moving image represented by the moving image signal and the still image represented by the digital still image signal; and controlling means for controlling said display means so as to change from displaying the moving image to displaying the still image represented by the digital still image signal in response to an instruction of said manually operable member, to automatically change from displaying of the still image to displaying of the moving image after a predetermined period of time has elapsed since the digital still image signal started to be recorded.

9. An apparatus according to claim 8, wherein said still image signal generating means comprises a memory for storing an image signal for one picture of the moving image signal obtained by said imaging means, said still image signal generating means reading the image signals for one picture from said memory and thereby generating the digital still image signal.

10. An apparatus according to claim 9, wherein said still image signal generating means includes compressing means for compressing an information amount of the digital still image signal.

11. An apparatus according to claim 9, wherein said still image signal generating means includes error correction coding means for adding an error correction check code to the digital still image signal.

12. An apparatus according to claim 8, wherein said recording means forms a plurality of tracks on a tape-shaped recording medium and records the digital still image signal on the plurality of tracks formed on the tape-shaped recording medium.

* * * * *

UNITED STATES PATENT AND TRADEMARK OFFICE
CERTIFICATE OF CORRECTION

PATENT NO. : 5,923,816
DATED : July 13, 1999
INVENTOR(S) : Osamu Ueda

It is certified that error appears in the above-identified patent and that said Letters Patent is hereby corrected as shown below:

On the Title page, Item [54]:

In the Title, delete "AND RECORDS STILL IMAGES DURING RECORDING MOVING IMAGES". Col. 1, line 29, delete "have the" and insert -- have a --.

Signed and Sealed this

Second Day of January, 2001

Attest:

Q. TODD DICKINSON

*Attesting Officer*    *Commissioner of Patents and Trademarks*